Patented Nov. 10, 1942

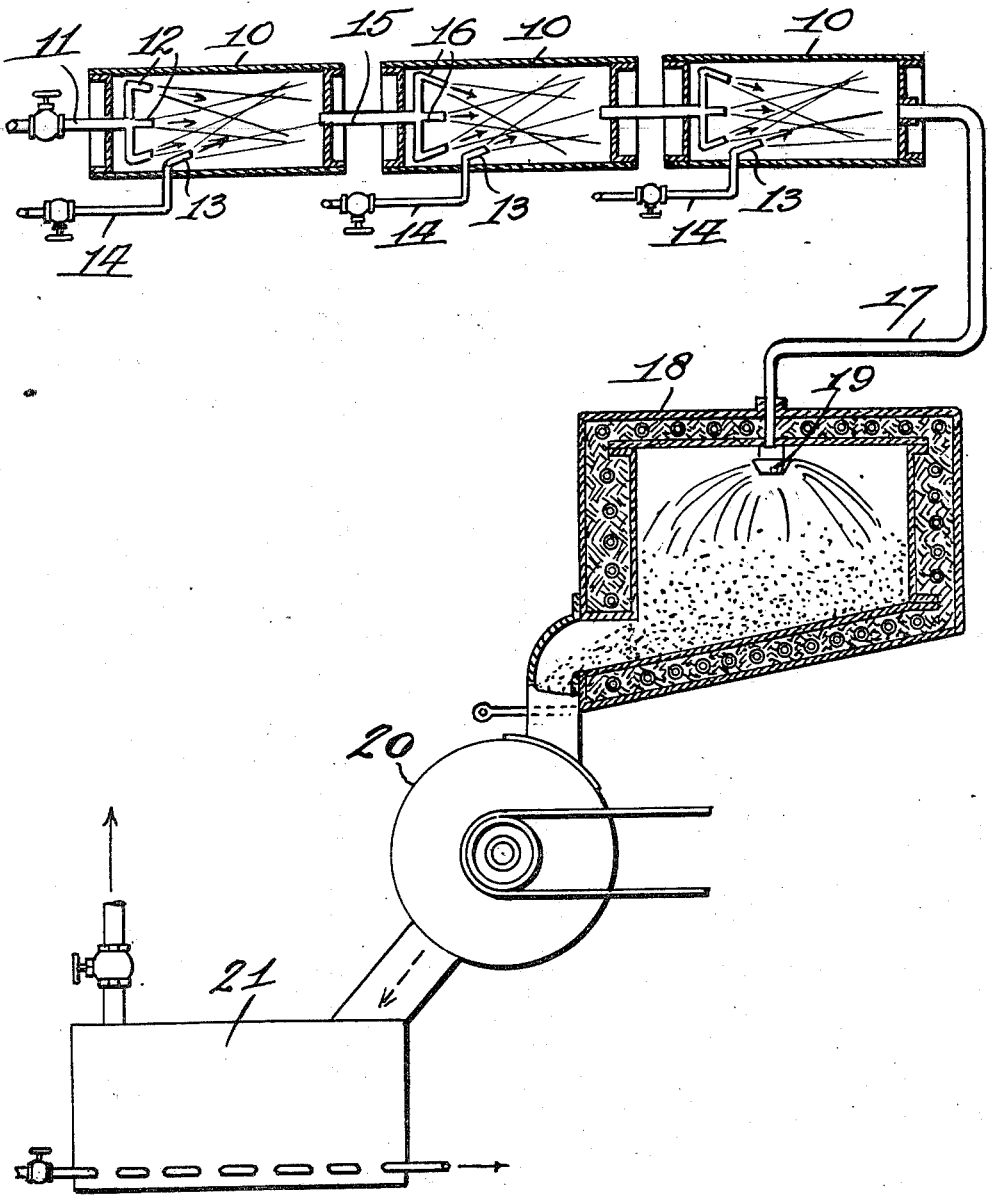

2,301,595

UNITED STATES PATENT OFFICE 2,301,595

METHOD OF TREATING BITUMENS AND/OR CRUDE PETROLEUM

Paul Washburn, Glendale, Calif.

Application September 2, 1939, Serial No. 293,228

9 Claims. (Cl. 196—1)

My invention relates to a method or process of treating crude petroleum, bitumens, and the like, and has for its principal object, the provision of a relatively simple and easily practiced method whereby the components of crude petroleum or bitumens, whether the same are found in liquid or solid form, may be separated and segregated without loss of any part of the treated products.

Briefly stated, my improved method consists in, first, injecting clean desanded crude petroleum into an air-tight chamber by means that converts the liquid hydrocarbon into fine spray or mist and which latter mixes by diffusion with moisture that is injected in the form of fine mist or spray into the chamber and such conversion of the liquid and its diffusion with moisture being repeated in succession in separate chambers, depending upon the character of the petroleum being treated, second, the injection of the spray or mist into a chamber in which temperatures below freezing are maintained in order to freeze the microscopic particles of mist or spray, third, mechanically grinding or disintegrating the frozen particles of hydrocarbon spray or mist to further break up the molecular structure of the hydrocarbon and the moisture that was diffused therewith during the first step of the process and fourth, the subjecting of the finely divided frozen particles to melting temperature within a chamber so as to effect segregation of all component gases and combustible matter comprising the component parts of the treated liquid hydrocarbon.

In accordance with my invention, the crude petroleum or bitumen is solidified, preferably by freezing, so as to convert all liquid formations into solids.

Where bitumen is in solid formation like coal, or of semisolid formation like shales, the same is reduced to dry powders and, where the bitumen or crude petroleum is in liquid form, the same is solidified by freezing and, the solid product is by suitable mechanical means ground or pulverized so as to produce bituminous ice particles that are microscopic in size.

In the treatment of liquid bitumens, the same are converted into spray or mist having extremely small particles and, such spray or mist is frozen by being discharged into a suitable container having temperatures below freezing and a suitable state of air saturation so as to affect and reduce the constituency of the raw bitumen.

The action of spraying the petroleum or bitumen takes place in an air tight container so that the volume of air may be in constant proportion and control to the volume of liquid bitumen or petroleum to effect hardest freezing of the most minute particles of the mist or spray, thus producing a bituminous sleet that includes its own moisture and the bituminous product or crude petroleum retaining all portions of its component hydrocarbons and constituent substances.

After the spray has been frozen into microscopic brittle ice particles, it is subjected to mechanical grinding or disintegration so as to further decrease the size of the microscopic frozen particles, so as to further break up and diffuse the molecular structure of the hydrocarbons including the moisture or water content of the products under treatment with the moisture that has been combined with the liquid hydrocarbon at the time the same was converted into mist or spray.

The freezing step of my improved method necessarily expands all the component microscopic particles that are subject to expansion by freezing and, the grinding or breaking up of the microscopic frozen particles breaks up the chemical adhesion, cohesion and attraction between said particles, but at the same time retaining their component properties and enabling the components of the bitumens or crude oils under treatment to be subsequently segregated without loss or destruction.

After the product in spray or mist form has been frozen and the frozen particles broken up in accordance with the first steps of the process, the frozen finely divided particles are subjected to melting temperatures by means of suitable heated containers, pipes, coils, or any other convenient means, so as to effect segregation under control, of all oils and gases. Under the first treatment with melting temperatures the relatively light low boiling point products, such as gasoline, kerosene, methane, propane, butane, and the like, pass off in the form of vapors which are recovered in the sequence in which they are vaporized and each vaporized product is recovered and converted into liquid by conventional condensation methods.

Obviously, the heavy hydrocarbons having high boiling points are the last to respond to the melting temperatures to be vaporized and segregated from the lighter low boiling point products and from each other.

Practically all crude petroleum contains a certain degree of moisture and, in the treatment of petroleums that are deficient in moisture, my process contemplates the addition of a certain amount of moisture, for instance, water or other liquid in the form of mist or fine spray and, the freezing of this moisture combined by diffusion with the component parts of petroleum and later converting the frozen particles into liquid, entirely eliminates the escape and consequent loss of any of the component parts of the treated body of hydrocarbon.

Likewise nearly all of the solid or semisolid bitumens, such as coal or shales, require the addition of a certain percentage of moisture, either water or other liquid, prior to the freezing action.

In the drawing I have shown a simple form of apparatus that may be utilized for practicing my improved method and such apparatus includes one or more air-tight containers 10, into one end of which leads a duct 11 that delivers liquid hydrocarbon under sufficient pressure to convert the liquid hydrocarbon into fine spray or mist as it discharges from injection jet nozzles 12 that are located within the container and connected to duct 11.

In order to bring about a more effective diffusion of the mist or spray within the container 10, the nozzles 12 may be disposed in angular relationship as illustrated in the drawing or they may be arranged so as to impart whirling movement to the jets of liquid hydrocarbon issuing therefrom.

Certain hydrocarbons require the addition of moisture and such moisture is injected into the container 10 by means of a jet nozzle 13 that enters the container 10 near the jet nozzles 12 and said nozzle 13 being connected to a duct 14 that supplies air under pressure.

Where a number of containers 10 are arranged in sequence so as to more effectively convert the liquid hydrocarbon into extremely fine spray or mist, a duct 15 leads from the end of the first container 10 opposite the end into which the duct 11 enters and this duct 15 leads to the interior of the next adjacent container 10 and within said last mentioned container the duct is provided with jet nozzles 16 that correspond with the nozzles 12.

Different hydrocarbons require different treatment in converting the liquid into fine spray or mist and diffusing the same with the additional moisture admitted to the containers through the ducts 14 and jets 13.

From the end of the container opposite the end in which the jet nozzles are located, where only one container is used or from the corresponding end of the last one in a series of containers, the diffused fine spray or mist passes through a conduit 17 to the interior of a container or housing 18 and located on the end of said conduit within said container is a spray nozzle 19.

The container 18 is equipped with conventional refrigeration means capable of lowering the temperature in the chamber within said container to at least 110 degrees below zero F.

In the treatment of certain hydrocarbons, temperatures of from 130 degrees to 150 degrees below zero F. are required.

As the liquid hydrocarbon discharges from nozzle 19 it is immediately frozen into microscopic particles and from the freezing chamber the particles are discharged into a mechanical grinder or disintegrator 20 which may be of any desired and conventional form. This grinder or disintegrator breaks up and disintegrates the microscopic particles of frozen hydrocarbon so as to decrease the size of such particles and which action breaks up and diffuses the molecular structure of the hydrocarbon, including the frozen moisture content carried by said hydrocarbon and which was added and diffused with the spray produced in the chamber or chambers 10.

From the grinder 20 the finely divided frozen particles discharge into a container 21 that may be heated by any conventional means, for instance, steam or hot water pipes or coils, or electric heating means, and the minute particles of frozen liquid hydrocarbon are subjected to temperatures running from 720 to 750 degrees above zero F. and which heating vaporizes all of the component parts of the liquid hydrocarbon and such components as gasoline, kerosene, methane, propane, butane, and the like, pass off in the sequence in which they are vaporized and each vaporized product is converted into liquid and recovered by conventional condensation methods.

In referring to petroleum and bitumen, Somers in volume I of his "Oil and Gas" sets forth that "Petroleum and natural gas are members of the bitumen family of hydrocarbons. Bitumens of commercial importance are natural gas, petroleum, and asphalt, representing respectively, the gaseous, liquid and solid members of the group. The chemical composition of both natural gas and petroleum differs greatly in different fields, although the chief constituents are carbon and hydrogen. For this very reason they are not in a true scientific sense, minerals, for a mineral is a substance having a definite chemical substance."

My method of segregating all of the hydrocarbons in crude petroleum and bitumen is effective in the treatment of solid and semisolid bitumens and, likewise effective in the treatment of all liquid bitumens or petroleum regardless of their differences in chemical composition in different fields, or even in one oil pool or in one oil well in the different producing strata thereof and further, my method is particularly effective and has the economical advantage of recovering all of the components of the petroleum or bitumen that is acted upon.

Inasmuch as clean desanded crude petroleum and all its component parts, including liquid hydrocarbons, paraffine, waxes, asphalt, tar, and the like, are combustible, my invention contemplates the treatment of such crude petroleum so that the entire body of treated product may be used for doing useful work, thereby gaining a material economic advantage over crude petroleum which in its cracking or other breaking down treatment has certain combustible elements such as paraffine, asphalt, tars, and the like, extracted therefrom. Thus for every one hundred pounds of crude petroleum treated by my improved method, there remains one hundred pounds of gasoline and other liquid hydrocarbons after the treatment, or where moisture in spray form is added to the sprayed crude during the initial step in the method, the volume of the product after treatment is correspondingly greater than the amount of the crude at the beginning of the treatment.

As hereinbefore stated, certain crude petroleums do not require the addition of moisture in spray form at the beginning of the treatment while other crudes require the addition of moisture, depending upon their gravities.

In my improved method, there is nothing removed from the treated crude petroleum and no solvents or the like are added other than a limited amount of moisture which is initially added to certain crude oil that is low in moisture content, and the method acts upon all of the component parts of crude petroleum so as to convert the same into useful products and without the losses that attend the extraction methods now in general use and which include the separation of waxes, paraffine, tar, asphalt, and the like, all of which are combustible, particularly when broken into infinitesimal particles and associated with like particles of liquid hydrocarbons.

In other words, my improved method contemplates the merging or dissolving of the ordinarily extracted products such as paraffine, waxes, asphalt, tars, and the like, which are of themselves combustible, with combustible liquid hydrocarbons, and consequently gaining an advantage by the useful work accomplished by the otherwise extracted products.

Thus it will be seen that I have provided a relatively simple and economical method of treating bitumens and petroleum for the purpose of segregating and recovering in segregated condition the component parts thereof.

I claim as my invention:

1. The method of treating petroleum which consists in converting petroleum and all of the component parts thereof into mist, combining and diffusing moisture in the form of mist with the petroleum mist, then freezing all of the mist particles, then breaking up the frozen particles of mist and then subjecting the broken particles of frozen mist to melting temperatures.

2. The method of treating petroleum which consists in converting petroleum and all of the component parts thereof into mist, simultaneously adding thereto finely divided particles of moisture, then freezing the mist particles, then breaking up the frozen particles of mist and then subjecting the broken frozen particles of mist to gradually increasing temperatures above freezing temperature.

3. The method of treating petroleum which consists in converting petroleum and all of the component parts thereof into mist, simultaneously adding thereto finely divided particles of moisture, then freezing the mist particles, then breaking up the frozen particles of mist and then subjecting the broken frozen particles of mist to melting temperatures.

4. The method of treating petroleum which consists in converting petroleum and all of the component parts thereof into mist, simultaneously adding thereto finely divided particles of moisture, subsequently freezing the mist particles, breaking the frozen mist into smaller particles so as to break up the molecular structure of the hydrocarbon including the moisture of the product under treatment, subjecting the broken mist particles to melting temperatures and segregating the component liquid and gaseous hydrocarbons as the same are developed by the melting of said broken mist particles.

5. The method of treating petroleum which consists in simultaneously converting petroleum and all of its component parts and added moisture into mist, solidifying the particles of mist by subjecting the same to freezing temperature, then breaking up the frozen particles of mist and then subjecting the broken particles of frozen mist to melting temperatures.

6. The method of treating petroleum which consists in simultaneously converting petroleum and all of its component parts and added moisture into mist, solidifying the particles of mist by subjecting the same to freezing temperature, then breaking up the frozen particles of mist, then subjecting the broken particles of frozen mist to melting temperatures and then segregating the component hydrocarbons of the petroleum as they are successively developed by melting under the rising temperatures.

7. The method of treating bitumen and all of its component parts which consists in converting the same into microscopic particles, then freezing said particles, then breaking up the frozen particles and then subjecting said particles to temperature sufficient to vaporize and segregate the component hydrocarbons forming said bitumen.

8. The method of treating bitumen and all of the component parts thereof which consists in breaking the bitumen into microscopic particles, adding a predetermined amount of moisture in the form of mist to said particles, freezing the particles of bitumen and moisture, then breaking up the frozen particles and then subjecting the broken particles to melting temperatures sufficient to segregate the component hydrocarbons of said bitumen.

9. The method of treating crude petroleum which consists in converting all of the component elements of said crude petroleum into mist particles, freezing said mist particles, breaking the frozen mist particles into smaller particles so as to break up the molecular structure of the hydrocarbon including the moisture of the product under treatment and then subjecting the broken particles to melting temperatures and thereby segregating the component hydrocarbons of the treated crude petroleum.

PAUL WASHBURN.